S. UHLICH.
SOLDERING APPARATUS.

No. 191,202. Patented May 22, 1877.

Witnesses:
W. Burris
H. A. Daniels

Inventor:
Samuel Uhlich
by G. B. Towle
Attorney.

UNITED STATES PATENT OFFICE.

SAMUEL UHLICH, OF MANSFIELD, OHIO.

IMPROVEMENT IN SOLDERING APPARATUS.

Specification forming part of Letters Patent No. 191,202, dated May 22, 1877; application filed April 16, 1877.

*To all whom it may concern:*

Be it known that I, SAMUEL UHLICH, of Mansfield, in the county of Richland and State of Ohio, have invented certain new and useful Improvements in Soldering Apparatus; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
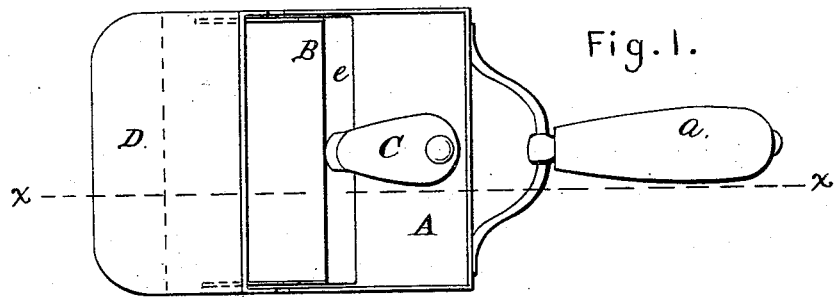
Figure 2:
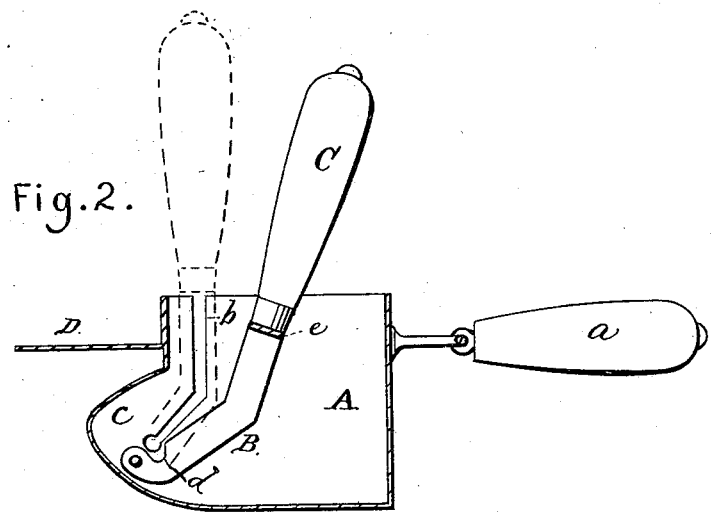
Figure 3:
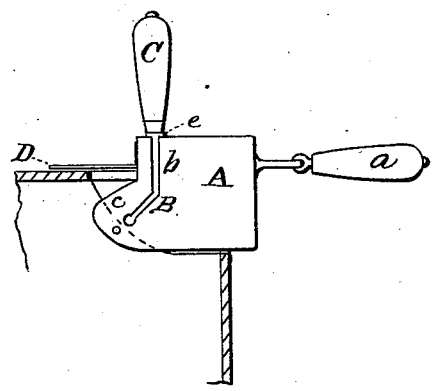

Figure 1 is a plan view of my improved soldering-pot; Fig. 2, a sectional view, as indicated by the line $x\ x$ of Fig. 1; Fig. 3, a view showing the end of the pot placed in a hole of the heating-furnace.

Like letters in all figures of the drawing indicate like parts.

This invention relates to a soldering apparatus for soldering the joints of telegraph and other wires, to prevent them from rusting; and it consists of a soldering-pot provided with a slot on each side to receive the wire, in combination with a pivotal clamp constructed to hold the wire in place while soldering the joint, and at the same time to prevent the melted solder from spilling out through the slots, so as to make a neat and well-protected joint; also, of an apron attached to the pot over the projection on the end thereof, to form a covering for a hole cut in the heating-furnace to admit the pot, as will be hereinafter more fully explained.

A is the soldering-pot, provided with handle $a$, and having a slot, $b$, made to extend down vertically on each side of the pot, and thence at an angle into the projecting part $c$ of the pot, each slot terminating in a round hole of the size of the wire; B, the clamp, which consists of two arms corresponding in shape somewhat to the shape of the slots, and pivoted each to the sides of the pot at a point a little back of the hole of each slot, and in a direct line with the angular part thereof, so that the arms will exactly cover the slots when moved forward to clamp the wire. Each arm has a hole or notch, $d$, of a semicircular shape cut in it obliquely to the hole in the end of the slots, to clasp and hold the wire when soldering the joint. The arms are connected to a cross-piece, $e$, or they may form a part of the same in one piece of metal. A handle, C, is attached centrally to the cross-piece for operating the clamp. The slots extend down near enough to the bottom of the projection $c$, which is curved or inclined up, so that when the pot is tipped forward the solder will cover the joint of the wire. D represents the apron, which is attached to the end of the pot over the projection $c$, so as to form a covering for a hole cut in the heating-furnace to admit the pot.

The operation of this invention is as follows: The joint of the wire to be soldered is placed in the pot containing melted solder, the wire on each side of the joint being slipped in the slots and pressed down until it finds a secure lodgment in each hole of the slots, when the clamp is moved forward to hold the wire in place, the arms of the clamp covering the slots at the same time, and preventing the solder from spilling out through the same; the pot is then tipped forward, so that the solder will cover the joint, thus making a neat and well-protected joint. The object of the invention is to provide a pot in which the wire can be inserted in the pot in a position for soldering the joint without bending the wire, in order to dip the joint in the solder, as heretofore, the operation of which is attended with a good deal of inconvenience, the pot being heavy and hard to handle, in consequence of its being nearly full of solder, which is liable to spill out of the pot; and, besides, the joints thus made are crooked and not well secured or covered with the solder, all of which is entirely obviated by this invention, as but little solder is required in the pot, rendering it light and easy to handle, and the joint can be soldered on the ground or on when the wires are in place on the poles.

Having thus fully described my invention, what I claim therein as new, and desire to secure by Letters Patent, is—

1. A soldering-pot provided with slots, to allow the wire to be inserted in the pot in a position for soldering the joint without bending the wire, substantially as and for the purposes set forth.

2. A soldering-pot having a slot on each side, made to terminate in a round hole to receive the wire, substantially as set forth.

3. A soldering-pot provided with a clamp for soldering the wire in place, in combination with slots $b$, substantially as and for the purposes set forth.

4. A soldering-pot provided with a clamp having arms B, with notch $d$, pivoted to the sides of the pot, and made to cover the slots, substantially as set forth.

5. The soldering-pot provided with a projection, $c$, to be inserted in the opening of a furnace, substantially as and for the purposes set forth.

6. The soldering-pot provided with an apron, D, in combination with the projection $c$, substantially as and for the purpose set forth.

7. The soldering-pot provided with projection $c$, in combination with slots $b$, substantially as described.

In testimony that I claim the foregoing as my own invention I affix my signature in presence of two witnesses.

SAMUEL UHLICH.

Witnesses:
H. K. PARSONS,
JOEL MYERS.